(12) United States Patent
Graves et al.

(10) Patent No.: US 6,459,545 B1
(45) Date of Patent: Oct. 1, 2002

(54) USE OF MATTE MATERIALS TO REDUCE SIGNAL POLLUTION IN CARTRIDGE DETECTION CIRCUITRY

(75) Inventors: Todd L. Graves, Garland; Wayne A. Sumner, Ogden, both of UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/524,147

(22) Filed: Mar. 14, 2000

Related U.S. Application Data

(63) Continuation-in-part of application No. 09/337,059, filed on Jun. 21, 1999, now Pat. No. 6,201,662, which is a continuation-in-part of application No. 09/161,007, filed on Sep. 25, 1998, now Pat. No. 6,266,211, which is a continuation-in-part of application No. 08/936,970, filed on Sep. 26, 1997, now Pat. No. 6,091,563.

(51) Int. Cl.[7] .................. G11B 23/03; G11B 23/04; G11B 23/28
(52) U.S. Cl. ................................ 360/133; 369/291
(58) Field of Search ........................... 360/133, 291

(56) References Cited

U.S. PATENT DOCUMENTS

| | | | |
|---|---|---|---|
| 4,678,300 A | 7/1987 | Beach | 354/21 |
| 5,252,836 A | 10/1993 | Matthews et al. | 250/571 |
| 5,291,006 A | 3/1994 | Nishiguma et al. | 235/454 |
| 5,488,473 A * | 1/1996 | Springsteen et al. | 356/317 |
| 5,986,838 A * | 11/1999 | Thomas, III | 360/60 |
| 6,091,563 A * | 7/2000 | Thomas, III et al. | 360/69 |
| 6,201,662 B1 * | 3/2001 | Graves et al. | 360/133 |
| 6,207,110 B1 * | 3/2001 | Sullivan et al. | 422/56 |
| 6,266,211 B1 * | 7/2001 | Thomas, III et al. | 360/133 |

FOREIGN PATENT DOCUMENTS

WO    WO 98/44504    10/1998

* cited by examiner

*Primary Examiner*—William Klimowicz
(74) *Attorney, Agent, or Firm*—Woodcock Washburn LLP

(57) ABSTRACT

A data storage cartridge for a data storage disk drive has a marker including a latent illuminance material such as phosphor. A matte material on the cartridge or within the marker diffusely reflects charging light that is not absorbed by the latent illuminance material in the marker. This reduces noise and signal pollution in the light then emitted by the latent illuminance material. Accordingly, an accurate decay time can be determined. The decay time is checked to provide identification of different types or generations of data storage cartridges or provides a secure keying mechanism for authorized access to proprietary software.

30 Claims, 7 Drawing Sheets

USE OF MATTE MATERIALS TO REDUCE SIGNAL POLLUTION IN CARTRIDGE DETECTION CIRCUITRY

This application is a continuation-in-part application of U.S. patent application Ser. No. 09/337,059, filed on Jun. 21, 1999, now U.S. Pat. No. 6,201,662 which is a continuation-in-par application of U.S. patent application Ser. No. 09/161,007, filed on Sep. 25, 1998, now U.S. Pat. No. 6,266,211 which is a continuation-in-part application of U.S. patent application Ser. No. 08/936,970, filed on Sep. 26, 1997 now U.S. Pat. No. 6,091,563.

FIELD OF THE INVENTION

The present invention relates in general to a system for identifying an object that includes a marker, where the system includes a source of irradiance and a detector of light emitted from the marker. More particularly, the present invention relates to the use of a matte material to within the marker or behind the marker to reduce the noise detected by the detector.

BACKGROUND OF THE INVENTION

Disk drives for receiving removable disk cartridges must have some mechanism for detecting the insertion or presence of a disk cartridge in the drive. The actuator that carries the recording heads of the disk drive across the recording surfaces of the disk should not be allowed to move unless the presence of an appropriate disk cartridge which is non-drive damaging is detected. The removability feature requires that the disk drive have a cartridge insertion opening into which foreign objects can be inserted. If these objects physically engage the drive as a legitimate cartridge would, then the heads could be loaded onto or into the foreign object, thereby destroying the drive. Also, the spindle motor of the disk drive will be activated by a falsely detected foreign object, thereby generating particle debris. In the prior art, mechanical switches are typically employed to detect the presence of a disk cartridge within the drive. Such switches are typically positioned such that when a disk cartridge is inserted fully into the drive, the cartridge contacts the switch, thereby providing an indication that the disk cartridge is present.

The ability to discriminate between cartridge types after insertion into a data storage device but prior to putting the read/write heads on the recording media is of significant value and utility. Principally, this utility comes from the ability to detect the difference between various capacities or generations of data storage cartridges in a downward media compatible data storage drive. This discrimination capability allows for drive/media specific adjustments to be made such as media rotation rate, data channel rates, location of Z track for initial seeking, or even mechanical adjustment in the drive like the active engagement of new crash stop locations. The ability of a disk drive to predetermine the type/generation of data storage cartridge inserted into it prior to enabling the spin-up and engagement of read/write elements also provides the drive system designer with new possibilities for cross-platform interchangeability.

"Retroreflective Marker For Data Storage Cartridge", U.S. Pat. No. 5,638,228, to Thomas, III, describes the reflection of a highly concentrated quasi circular lobe of light whose spread on reflection is captured by the aperture of a phototransistor in close proximity to a light emitting diode (LED). This emitter/detector pair is in the drive and a retroreflective array is on the cartridge. The desired light lobe size is provided by the geometric size of the retroreflector array elements relative to the spacing of the emitter and the detector in the drive. Due to this physical size matching and the fact that retroreflectors are used, this marker on the cartridge is quite insensitive to cartridge tilt and distance from the emitter/detector pair in the drive. This patent is incorporated herein by reference.

As disk storage products become smaller and smaller, the need for a cartridge marker of thinner physical size is required. In very thin disk drives where the distance between the cartridge marker or tag and the optical sensing device is very small (e.g., 1 mm), the inherent reflective gain mechanism obtained with a retroreflector over a diffuse or specular reflector is lost. Holographic directional light control is possible, but due to the very small working distances, the ability for false engagement of the drive is significantly increased with that approach.

"Latent Illuminance Discrimination Marker System For Data Storage Cartridge", U.S. patent application Ser. No. 08/936,970, filed Sep. 26, 1997 (attorney docket no. IOM-9599), now U.S. Pat. No. 6,091,563 to Thomas, III, incorporated herein by reference, describes the use of a latent illuminance marker to identify an object such as a data storage cartridge. A charging light is applied to a latent illuminance marker, comprising a phosphor for example, the charging light is turned off, and the emitted light is detected by a detector such as a phototransistor. Characteristics of the emitted light are used to identify the data storage cartridge. The signal of the emitted light is usually quite faint and is typically amplified or increased. However, amplifying the signal does not increase the discrimination ratio because all signals are amplified by the same amount. The discrimination ratio (i.e., the ratio of the desired and the undesired signals) quantifies how robustly the system operates.

Typically, the latent illuminance material is charged by a light source, such as an LED having a wavelength close to that of the light that is emitted by the latent illuminance material. For example, the charging LED may have a wavelength of about 650 nm (i.e., the latent illuminance material is charged by light having a wavelength of about 650 nm), and the latent illuminance material may emit light having wavelengths between about 750 nm and 1075 nm. In this manner, the signal detected by the detector of emitted light may be polluted by any charging light that is reflected within the system, thereby leading to increased noise in the system and an overall decrease of system performance.

Although the art of detecting and discriminating between data storage cartridges is well developed, there remain some problems inherent in this technology, particularly when the charging light has a wavelength close to the wavelength of the light emitted by the marker. Therefore, a need exists for a tag that produces reliable detection and discrimination between data storage cartridges when the charging light has a wavelength close to the wavelength of the light emitted by the marker.

SUMMARY OF THE INVENTION

The present invention is directed to a cartridge for a data storage drive which has a source of irradiance at an irradiance wavelength and a detector of irradiance for determining whether the cartridge is suitable for use in the drive. The cartridge comprises a body; a data storage medium in the body; a marker on the body that receives irradiance from the source and emits irradiance having an initial intensity value toward the detector for detection which thereby identifies the cartridge as being suitable for use in that drive; and a matte material disposed between the marker and the body, the material receiving irradiance from the source.

According to one aspect of the present invention, the body comprises the matte material. According to another aspect of the present invention, the matte material is disposed within the marker, preferably mixed with the latent illuminance material.

According to other aspects of the present invention, the matte material has a substantially concave shape, and the latent illuminance material is disposed within the substantially concave shape of the matte material.

According to a farther aspect of the present invention, the latent illuminance material comprises a phosphorescent material.

The foregoing and other aspects of the present invention will become apparent from the following detailed description of the invention when considered in conjunction with the accompanying drawings.

DESCRIPTION OF EXEMPLARY EMBODIMENTS AND BEST MODE

The present invention is directed to a latent illuminance marker (hereinafter also referred to as a tag) which is used to identify and discriminate the type of data storage cartridge (hereinafter also referred to as a disk cartridge) that has been inserted into a disk drive. The present invention provides an optical detection mechanism so that it can be ascertained with near certainty that an inserted object is an appropriate disk cartridge. The tag system is a highly effective discriminant of appropriate cartridge insertion for a disk drive and can also be used to prevent unauthorized copies of software from being easily reproduced and used in disk drives.

One means of effecting this software protection is to make the latent illuminance tag alone or in conjunction with data on the storage media a key mechanism that is inserted in the data storage drive for operation of the software. It should be noted that the term "illuminance" as used herein includes, but is not limited to, irradiance and the spectrum of light including ultra-violet (UV), visible, and near infrared.

Figure 1:
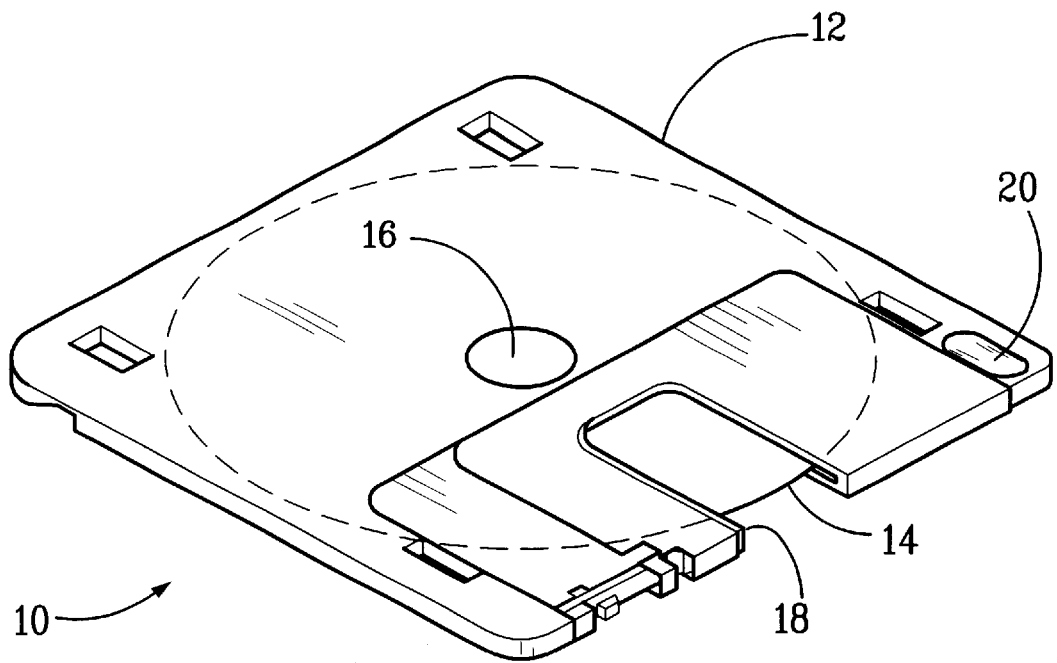
FIG. 1 shows an exemplary data storage cartridge of the present invention.

FIGS. 1 and 2 show a cartridge and a disk drive to which the present invention is applicable. The cartridge and drive are described in U.S. Pat. No. 5,809,520, issued Sep. 15, 1998, to Edwards et al., which is incorporated herein by reference.

The disk cartridge 10 comprises an outer casing or body 12 and a disk-shaped recording medium 14 which is affixed to a hub 16 that is rotatably mounted in the casing 12 which is the base or substrate for a marker 20. An opening on the bottom shell of the casing 12 provides access to the disk hub 16. A head access opening in the front peripheral edge 18 of the disk cartridge 10 provides access to the recording surfaces of the disk by the recording heads of a disk drive. The latent illuminance marker or tag 20 is positioned on the disk cartridge 10 to be detected by a detector in a disk drive.

Figure 2A:
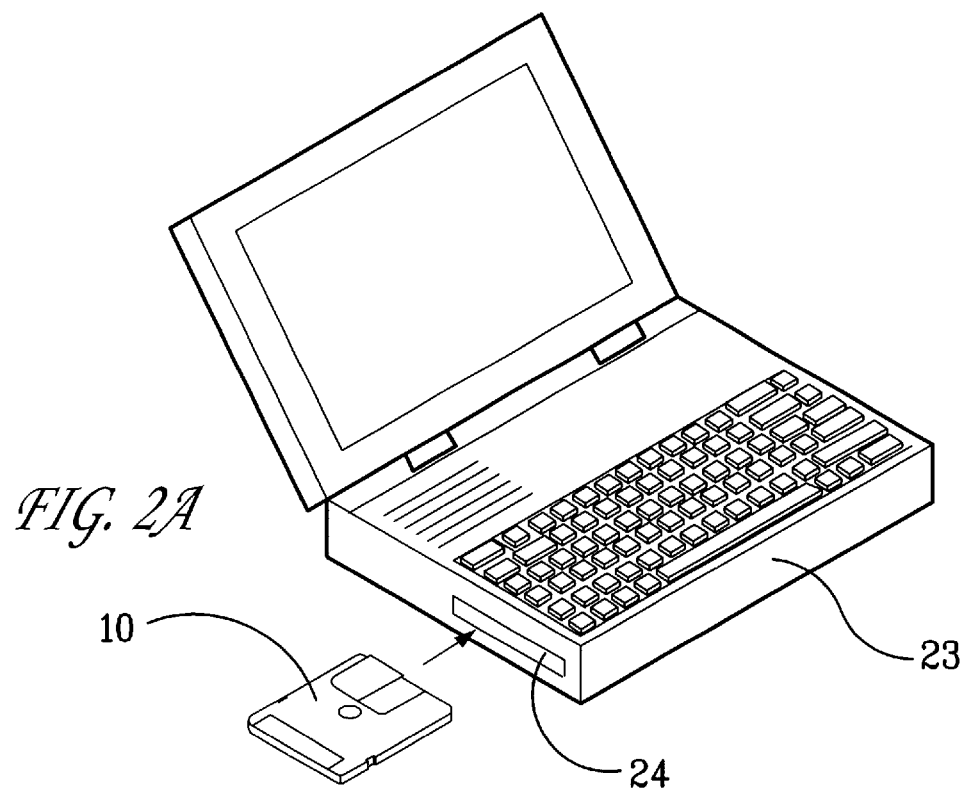
FIG. 2A is a perspective view of an exemplary device in which the invention is used.
Figure 2B:
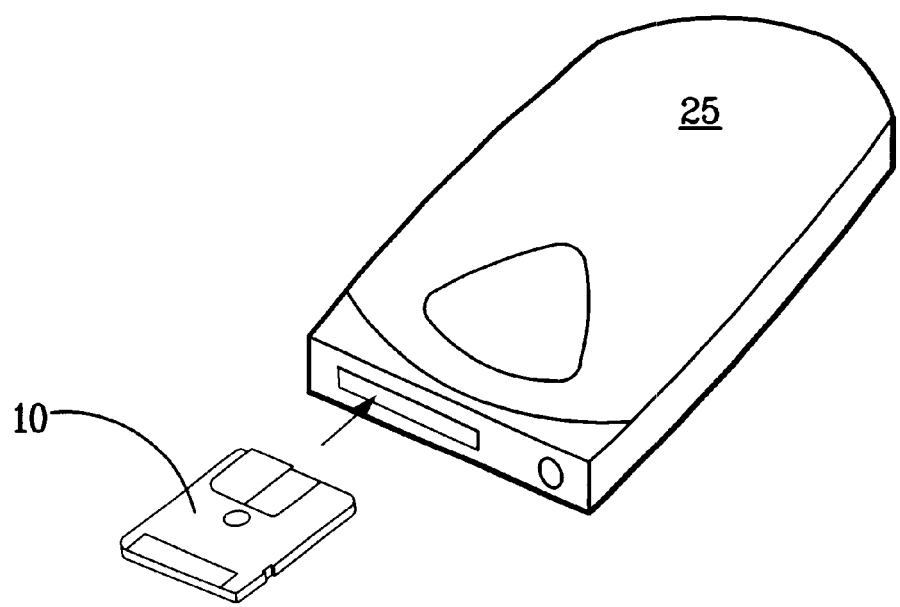
FIG. 2B is a perspective view of another exemplary device in which the invention is used.
Figure 2C:
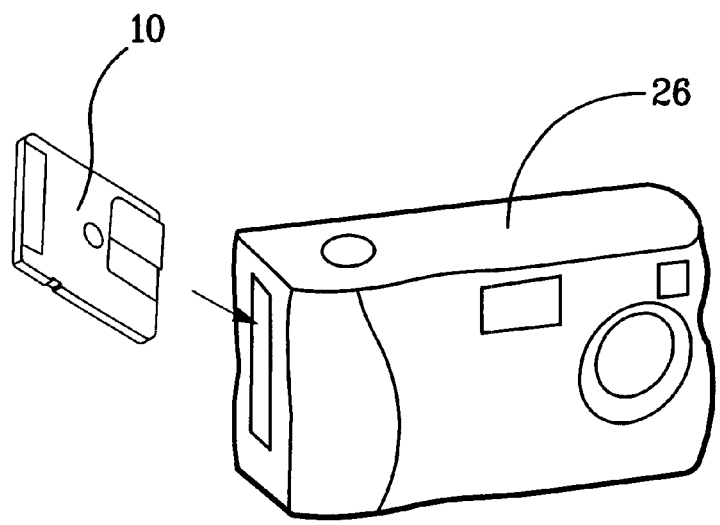
FIG. 2C is a perspective view of another exemplary device in which the invention is used.

FIG. 2A shows a laptop computer 23 which has a disk drive 24 for receiving the disk cartridge 10 of FIG. 1. The drive 24 may be the Iomega ZIP drive which is disclosed and claimed in the U.S. patents identified in U.S. Pat. No. 5,638,228. The drive 24 can either be incorporated into a computer or another data generating device such as a digital camera, smart phone, or personal digital assistant or can be a standalone portable drive, separable from a data generating device such as a computer, a digital camera, a smart phone, or personal digital assistant, for example. FIG. 2B shows a portable data storage drive or disk drive 25 for receiving the disk cartridge 10 of FIG. 1, and FIG. 2C shows a digital camera 26 for receiving the disk cartridge 10 of FIG. 1.

The latent illuminance marker 20 on the cartridge 10 is desirably very thin in order for the cartridge to fit in the thin form factor of the drive. Although any material exhibiting latent illuminant properties or characteristics can be used in accordance with the present invention, a phosphorescent material is used in a preferred embodiment of this invention. Materials of this type are often used for the detection of infrared radiation.

Figure 3A:
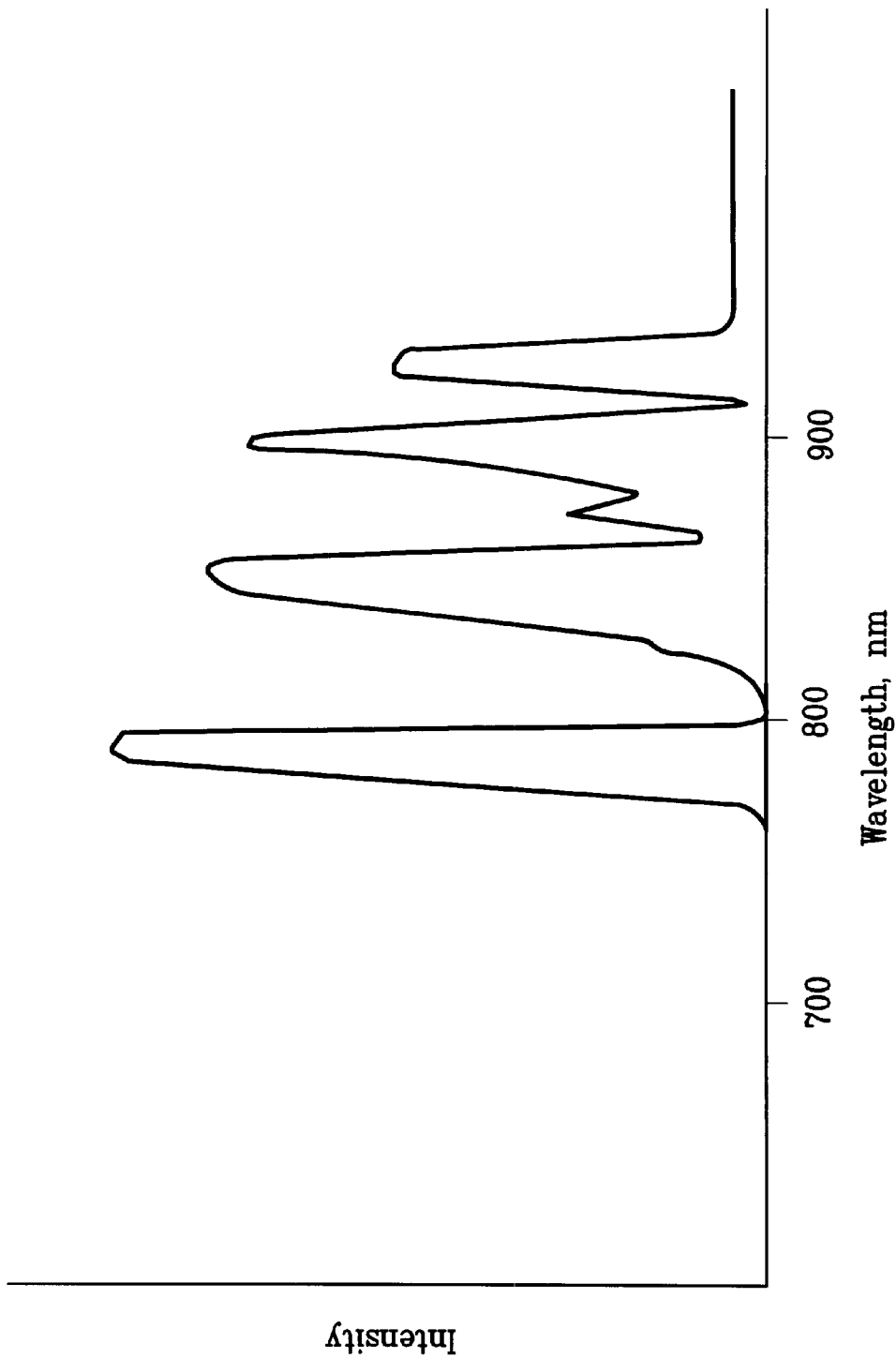
FIG. 3A is an exemplary latent illuminance output spectrum for a tag in accordance with the present invention.

The latent illuminance tag is preferably phosphorescent and can be attached to a data storage cartridge as a sticker, or printed into or applied via suspension in an adhesive compound such as a UV curable epoxy onto a data storage cartridge. On each disk cartridge having an authorized copy of the software, there is a tag which is preferably coated with a phosphorescent photoluminent material which serves to identify the type or generation of disk cartridge and distinguish it from other types of disk cartridges and purely passive light reflectors. The phosphor type materials used in the phosphorescent tag fluoresce for a period of time after a charging light source, preferably an LED, that has illuminated the tag is turned off. The LED strikes the tag at an excitation wavelength (e.g., about 650 nm) and the light emitted from the tag has a wavelength (or wavelengths) that is shifted from the excitation wavelength (e.g., between about 750 nm and 1075 nm). The wavelength(s) can be shorter or longer than the excitation wavelength. As described above, the light emission from the tag is called phosphorescence. An exemplary latent illuminance output spectrum for a tag in accordance with the present invention is shown in FIG. 3A. The output spectrum is characteristic of the material that comprises the tag. The intensity of the illuminance (light) emitted at at least one of the wavelengths (e.g., about 780 nm) can be monitored to measure a decay time, as described below.

Preferably, the latent illuminance material is excited with light close to a single wavelength (e.g., about 650 nm). The latent irradiance emitted by the latent illuminance material can be at a single wavelength, or at a spectrum of wavelengths (e.g., between about 780 and about 1075 nm). In the latter case, the signal used to determine the decay period (hereinafter also referred to as a decay time or time constant) is measured as the aggregate of the spectrum of wavelengths being detected by the sensor.

Figure 3B:
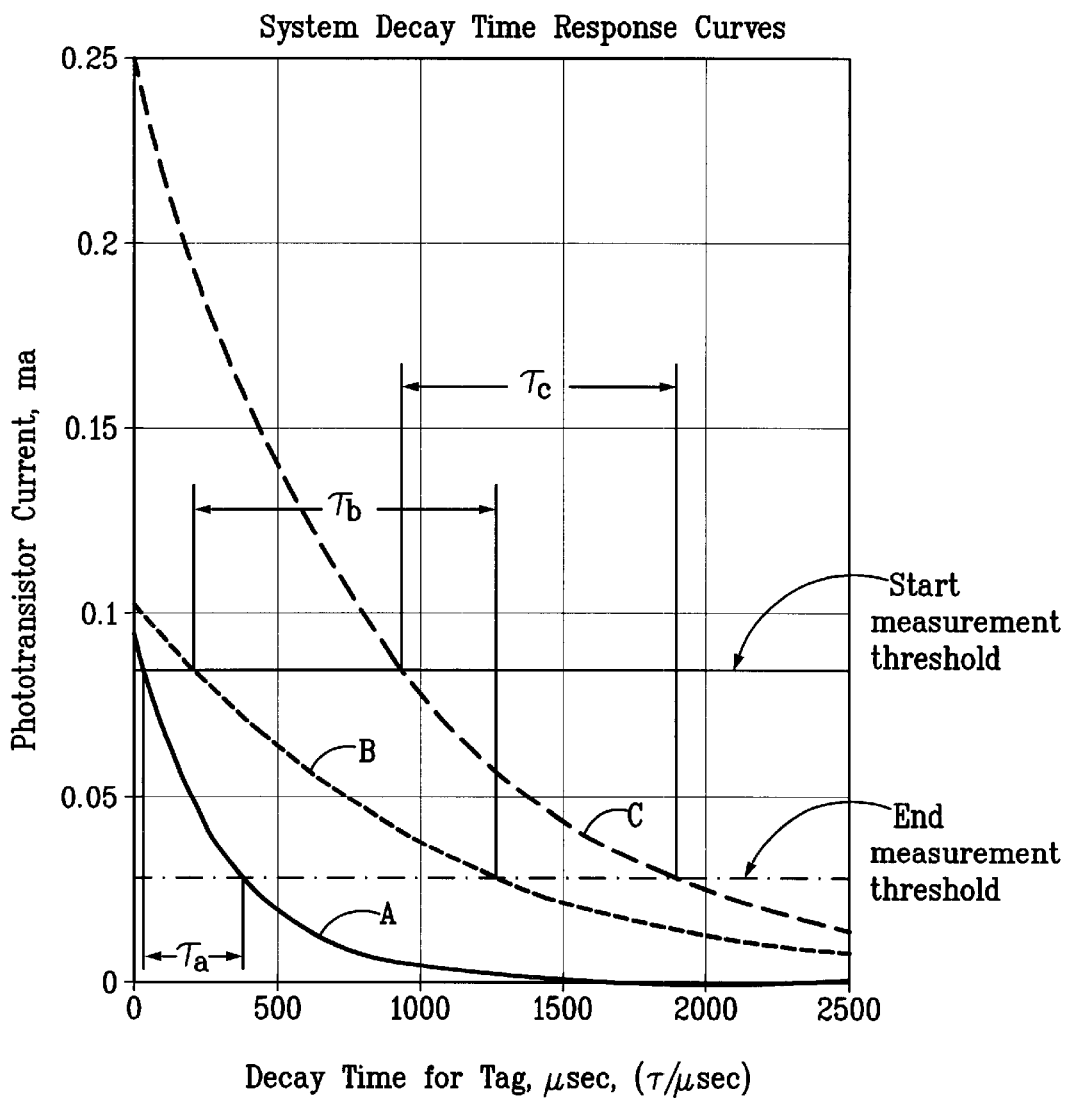
FIG. 3B is a diagram of exemplary decay rates for exemplary tag materials in accordance with the invention.

The tag will emit illuminance (light) in accordance with the output spectrum for a period of time after being illuminated with a light source. The decay time for the emitted illuminance ranges from sub-microseconds to several minutes, and preferably between about 50 $\mu$sec and about 3,000 $\mu$sec, depending on the material that is phosphorescing and the wavelengths that are being monitored. A decay time constant used to specify the tag is the time it takes for the latent irradiance to decay to some fraction or percentage, such as 37%, of its initial value. In accordance with a preferred embodiment, the decay in irradiance takes the form $e^{-t/(Tx)}$ where T is the decay time constant for a predetermined amount of decay, X is a predetermined constant that preferably ranges between about 0.36 and about 2.3, and t is the elapsed time from when the charging LED is turned off, or the elapsed time for the decaying signal level to pass from a first predetermined magnitude or intensity level through a second lower level which is fixed and predetermined, and is preferably a predetermined percentage below the first magnitude level, but can be a predetermined percentage below the initial value. For example, for a decay of about 30% of the initial latent illuminance, X is about 0.36. FIG. 3B illustrates this decay for three different exemplary tag materials, A, B, and C, as a graph of phototransistor current versus decay time for the tag. As described below, a phototransistor or photodiode are the preferred detectors used to detect the emitted illuminance from a tag.

Figure 3C:
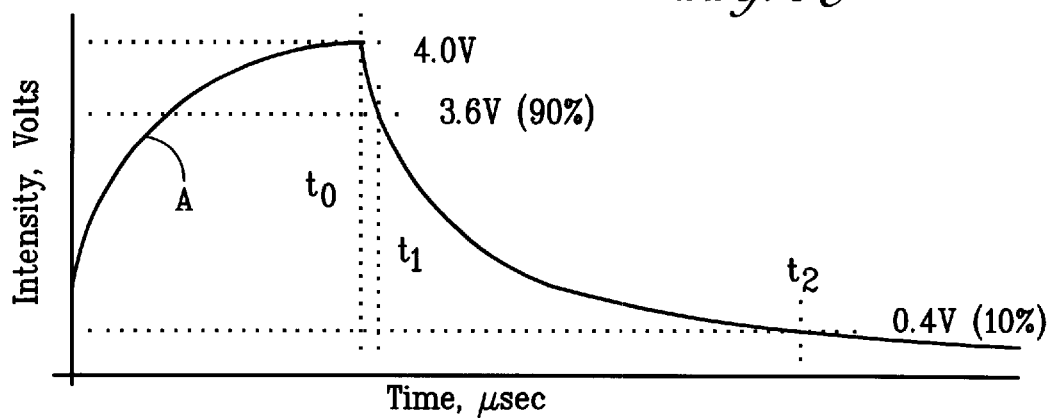
FIG. 3C is an exemplary decay pattern for a tag in accordance with the present invention.

FIG. 3C shows an exemplary decay pattern for a tag in accordance with the present invention. The intensity is measured for a predetermined wavelength. As the tag is being illuminated (charged) by the LED light source, it begins to emit illuminance, as indicated by line A. The LED light source is turned off at time $t_0$, and the tag thereafter emits latent illuminance from an initial peak value, such as about 4.0 volts, to a low value, ultimately approaching about 0 volts. The decay time is measured between two or more thresholds, such as between 90% and 10% of the initial value; i.e., the time between about 3.6 volts and 0.4 volts, or $t_2 - t_1$. This decay from the initial 3.6 volt threshold level to a 0.4 volt threshold level illustrates an embodiment where about an 89% decay time is measured (100*(3.6−0.4)/3.6). The measured decay time is compared with a predetermined decay time to determine whether or not the data storage cartridge or disk that has been inserted in the disk drive is appropriate for use with the disk drive. If so, the read/write heads of the disk drive are then able to engage the disk without risk of damage. Moreover, the data storage cartridge can be identified as a particular type or generation, and the disk drive can engage it accordingly. Although the preferred embodiment is directed to an exponential decaying latent illuminance material, it is also appreciated that non-exponential optically decaying latent illuminance materials can also be used with the present invention.

In a preferred embodiment, the system measures the latent illuminance times between two pairs of thresholds in order to ensure greater accuracy in authentication and validation and to eliminate a linear response that emulates the exponential decay. Each pair of thresholds is preferably the same percentage decrease in intensity. In one example, a first pair of thresholds is 90% and 60%, or the time it takes the latent illuminance intensity to decrease from 90% to 60%, which is a decrease in intensity of 33% or one-third. The second exemplary pair of thresholds is 60% and 40%, which is also a decrease in intensity of 33% or one-third. The irradiant decay is timed between the first and second thresholds, and the second and third thresholds. The time it takes for the illuminance to decrease between the first set of thresholds should be approximately equal to the time it takes the illuminance to decrease between the second set of thresholds because the percentage decrease in intensity is the same between the two pairs of thresholds. With an exponential decay, the times are approximately equal. If these two times are approximately equal, then it is known that the detected light is being emitted from something having a decay time similar to the authentic tag. For further validation purposes, the time can be compared to a predetermined time to further ensure that the tag is authentic or valid. Thus, a means for verifying that the decay rate being measured is truly of exponential form and not linear is provided.

Figure 4A:
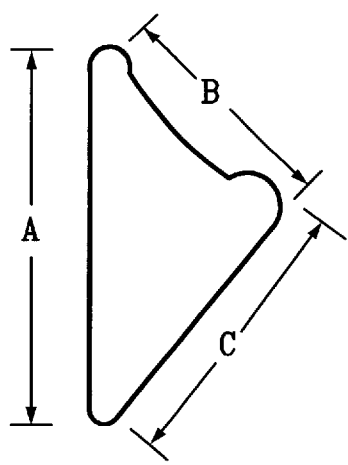
FIGS. 4A and 4B show a plan view and a cross section, respectively, of one exemplary embodiment of the invention.

The tag can be any size or shape that fits on the disk cartridge, with the thickness, or ink thickness if printed, preferably less than about 0.5 mm and a thickness tolerance of about ±0.05 mm. FIG. 4A shows the preferred physical dimensions of the tag implementation for a cartridge application, with dimensions: A equals approximately 1.2 cm, B equals approximately 0.9 cm, and C equals approximately 1.0 cm. The sheet tolerance for the tag illustrated in FIG. 4A is about ±0.13 mm.

Figure 4B:
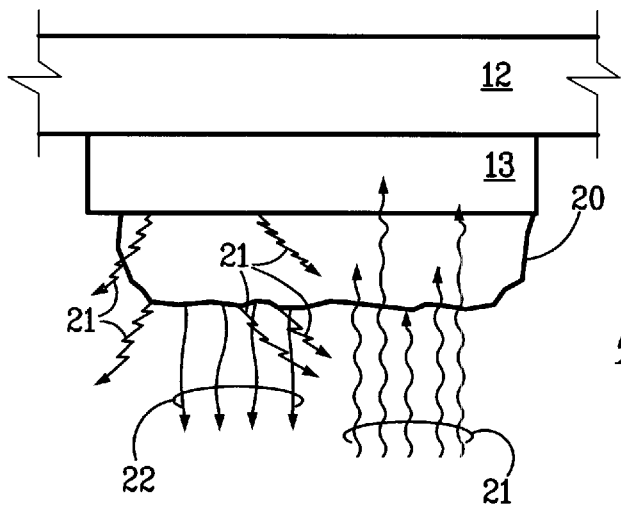
Figures 6, 7:
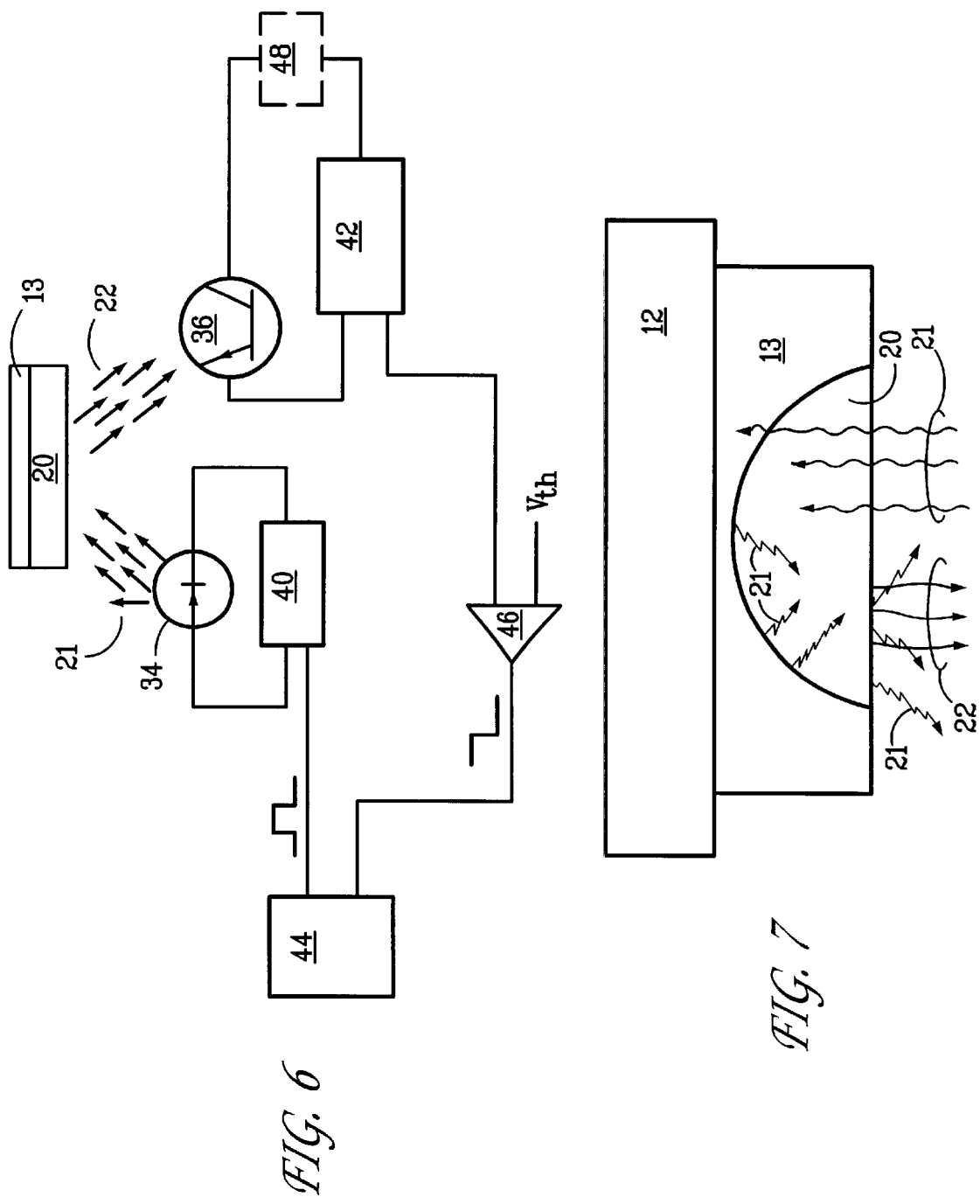
FIG. 6 shows a block diagram of an exemplary system in accordance with the present invention.
FIG. 7 shows a cross section of another exemplary embodiment of the invention with a concave matte surface.

According to the invention, a matte material or other diffuse reflective material is used to reduce the unused (reflected) charging light seen by the detector (e.g., detector 36 shown in FIG. 6). FIG. 4B shows an exploded perspective view of a matte material 13 disposed between the emissive material of the marker 20 and the casing 12 of the disk cartridge. A charging light 21 is applied to the marker 20. Most, if not all, of any charging light 21 that is not absorbed by the marker 20 (i.e., reflected charging light) is diffusely reflected by the matte material 13. In this manner, light emitted from the marker 20 is not significantly polluted or distorted by reflected charging light. Thus, the system is more robust and reliable.

Figure 5A:
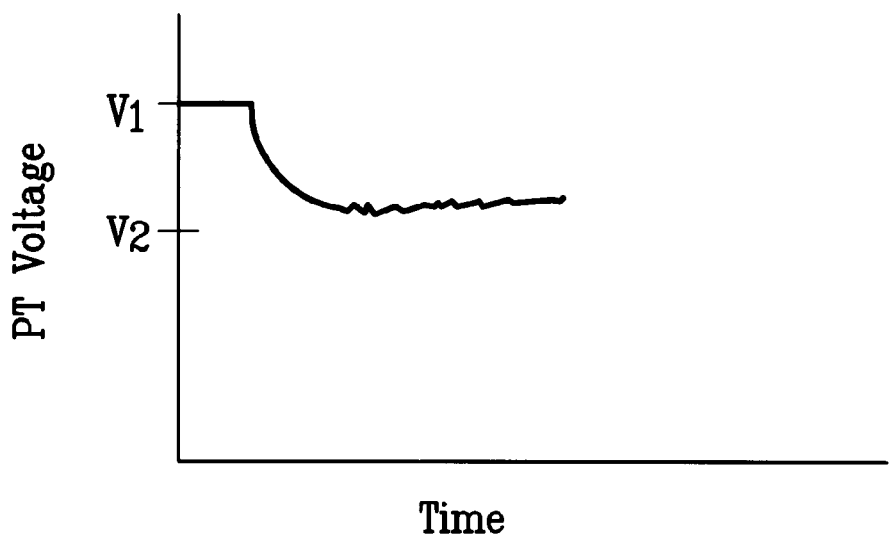
FIGS. 5A and 5B are diagrams of phototransistor (emitted light detector) voltage vs. time after the charging light is removed, for a latent illuminance marker without a matte material and for a latent illuminance marker with a matte material, respectively, in accordance with the present invention.
Figure 5B:
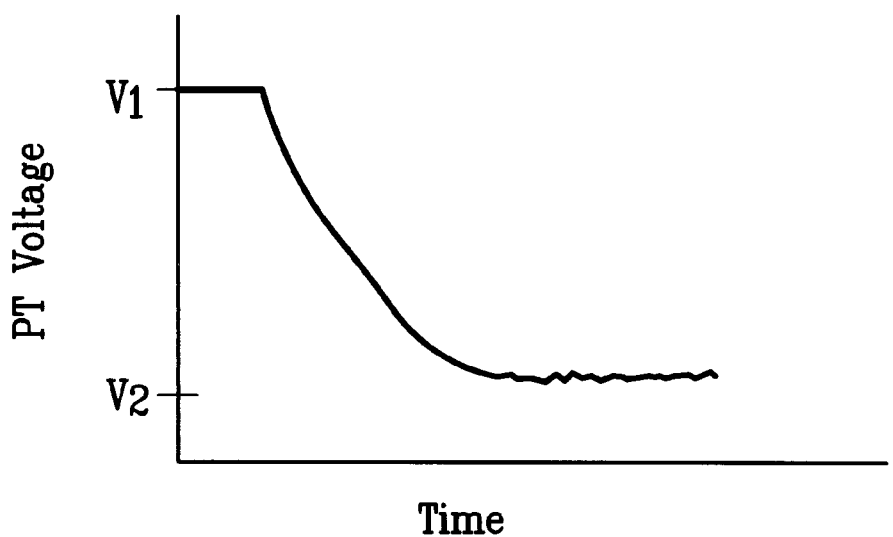

As described above, the discrimination ratio is the ratio of the desired signal to the undesired signal. The discrimination ratio quantifies how robustly a system operates. The higher the discrimination ratio, the more robust a system is. FIGS. 5A and 5B show phototransistor (emitted light detector) voltage vs. time after the charging light is removed, for a latent illuminance marker without a matte material and for a latent illuminance marker with a matte material, respectively. In FIG. 5A, without a matte material, the discrimination ratio, $V_1/V_2$, is low compared to the discrimination ratio in FIG. 5B. Thus, because the discrimination ratio with the matte material is higher than without the matte material, the system using the matte material is more robust and reliable.

In one exemplary embodiment, the outer casing 12 of the disk cartridge embodies the matte material 13, and in another embodiment, the matte material 13 is disposed within marker (e.g., mixed with the latent illuminance material in the marker), as a binder, for example. FIG. 6 shows a block diagram of an exemplary system in accordance with the present invention. A light source 34, preferably an LED, illuminates a latent illuminance tag or marker 20 with light 21 and is then turned off. The LED 34 is driven by LED switching and current limiting electronics 40, and a microprocessor 44 which sends pulse commands to the electronics 40. The tag 20 emits illuminance 22, having an initial intensity value at a particular wavelength or wavelengths, which is detected by a detector 36, preferably a phototransistor or photodiode. Preferably, the detector 36 waits a predetermined time, such as about 10 μsec, after the LED is turned off before beginning measurement of the latent illuminance at the particular wavelength(s) from the tag. Gain, preferably 100×, is applied to the output of the phototransistor or photodiode 36 by a gain stage 42. The output of the gain stage 42 is provided to a comparator 46 which compares the emitted illuminance with a threshold Vth. The results of the comparison are provided to the microprocessor 44 which measures the timing, determines the decay rate or time, and identifies the disk cartridge for validation, as described above. Element 48 contains optional filters.

More particularly, when a data storage cartridge is inserted into a disk drive, the light source 34, preferably an LED, emits a short intense pulse of light 21. The light 21 can be one pulse or a continuous cycle of pulses. Moreover, in another exemplary embodiment, the detection circuitry optically pumps the phosphorescent tag with the light source and measures and compares a phase lag between the drive signal and the decay illuminance. This provides a measure of the decay time constant.

LEDs are capable of handling large current surges for short periods to generate bright flashes of light. The outputted LED light 21 illuminates the latent illuminance tag 20 and thereby excites atoms or ions which emit light 22 as they decay to lower energy levels. The phosphor type materials used in the preferred latent illuminance tag 20 fluoresce for a period of time after the LED 34 is turned off. The photonic sensor 36 is in close proximity to the LED 34. This sensor 36 is initially saturated by the emitted light from the tag 20, preferably significantly above the high detection threshold level such that component life and manufacturing tolerances are accommodated (i.e., do not significantly affect the performance of the device). Once the LED 34 is turned off, the disk drive microprocessor 44 or a functionally similar system monitors the output of the photonic sensor 36 and, in an exemplary embodiment, determines the decay time required for the latent illuminance or phosphorescence to fall through two predetermined thresholds, thus establishing the desired decay rate. The decay time measured by the drive microprocessor 44 provides information by which the drive can determine which generation or type of cartridge has been inserted. It is noted that alternate embodiments establish a decay rate to identify the cartridge based on the time required for the latent illuminance or phosphorescence to fall below a predetermined threshold, or fall through multiple thresholds, such as two sets of two predetermined thresholds.

The thresholds are preferably fixed, predetermined values, but it is understood that the microprocessor could measure the initial intensity value of the latent illuminance and, based on the initial value, determine the thresholds and expected decay times. Moreover, the thresholds could be fixed intensity values (e.g., about 3.0 volts and about 1.0 volts) determined independently, and not determined responsive to a percentage of the initial value or any other threshold.

In an exemplary embodiment, illustrated in FIG. 7, the matte surface 13 is concave to better diffusely reflect light 21 that is not absorbed by the latent illuminance material within the marker 20 in order to get a stronger response from the latent illuminance material.

The present invention can be used to identify read only disks, write once disks, and disks having particular applications, such as photodisks for digital camera applications, global positioning or map disks, and book disks.

Although the present invention has been described herein with respect to cartridge detection, it can be used in any object detection or discrimination apparatus or application, such as anti-counterfeiting apparatus and applications.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A cartridge for a data storage drive which has a source of irradiance at an irradiance wavelength and a detector of irradiance for determining whether the cartridge is suitable for use in said drive, comprising:
   a body;
   a data storage medium in said body;
   a marker on said body that receives irradiance from said source and emits irradiance having an initial intensity value toward said detector for detection which thereby identifies said cartridge as being suitable for use in that drive; and
   a matte material disposed between said marker and said body, said material receiving irradiance from said source.

2. The cartridge of claim 1, wherein said body comprises said matte material.

3. The cartridge of claim 1, wherein said matte material has a substantially concave shape.

4. The cartridge of claim 3, wherein a latent illuminance material is disposed within said substantially concave shape of said matte material.

5. The cartridge of claim 1, wherein said marker has a latent illuminance wavelength spectrum in the range between about 750 nm and about 1075 nm, and said matte material diffusely reflects irradiance having a wavelength of about 650 nm.

6. The cartridge of claim 5, wherein said irradiance wavelength is outside of said latent illuminance wavelength spectrum.

7. The cartridge of claim 1, wherein said marker comprises a latent illuminance material that comprises a phosphorescent material.

8. The cartridge of claim 1, wherein the data storage drive is a portable and separable from a data generating device.

9. The cartridge of claim 8, wherein the data generating device is one of a computer, a digital camera, a smart phone, and a personal digital assistant.

10. The cartridge of claim 1, wherein the data storage drive is incorporated into a data generating device.

11. The cartridge of claim 10, wherein the data generating device is one of a computer, a digital camera, a smart phone, and a personal digital assistant.

12. A cartridge for a data storage drive which has a source of irradiance at an irradiance wavelength and a detector of irradiance for determining whether the cartridge is suitable for use in said drive, comprising:
   a body;
   a data storage medium in said body;
   a marker on said body that receives irradiance from said source and emits irradiance having an initial intensity value toward said detector for detection which thereby identifies said cartridge as being suitable for use in that drive, said marker comprising a latent illuminance material and a matte material.

13. The cartridge of claim 12, wherein said marker has a latent illuminance wavelength spectrum in the range between about 750 nm and about 1075 nm, and said matte material diffusely reflects irradiance having a wavelength of about 650 nm.

14. The cartridge of claim 13, wherein said irradiance wavelength is outside of said latent illuminance wavelength spectrum.

15. The cartridge of claim 12, wherein said latent illuminance material comprises a phosphorescent material.

16. The cartridge of claim 12, wherein the data storage drive is a portable and separable from a data generating device.

17. The cartridge of claim 16, wherein the data generating device is one of a computer, a digital camera, a smart phone, and a personal digital assistant.

18. The cartridge of claim 12, wherein the data storage drive is incorporated into a data generating device.

19. The cartridge of claim 18, wherein the data generating device is one of a computer, a digital camera, a smart phone, and a personal digital assistant.

20. A method of identifying a type of data storage cartridge having a marker on a body of the data storage cartridge, comprising the steps of:
    irradiating the marker with a charging light from a source of irradiance;
    diffusely reflecting a portion of said charging light at a matte material;
    detecting irradiance transmitted from the marker at a photodetector; and
    determining the type of data storage cartridge responsive to said detected irradiance.

21. The method according to claim 20, further comprising disposing said matte material between the marker and the body.

22. The method according to claim 21, wherein the disposing said matte material comprises disposing said matte material in a substantially concave shape on the body.

23. The method according to claim 22, wherein the body has a matte finish.

24. The method according to claim 21, wherein the body has a matte finish.

25. The method according to claim 20, farther comprising disposing said matte material within the body.

26. The method according to claim 20, further comprising disposing said matte material within the marker.

27. The method according to claim 20, wherein the diffusely reflecting said portion of said charging light at said matte material comprises diffusely reflecting irradiance having a predetermined wavelength.

28. The method according to claim 27, wherein said irradiance transmitted from the marker has a latent illuminance wavelength spectrum in the range between about 750 nm and about 1075 nm, and said predetermined wavelength is about 650 nm.

29. A method for determining the type of a data storage cartridge for use with a data storage drive, comprising:
    inserting said data storage cartridge having a phosphorescent marker and a matte material into said drive;
    illuminating said phosphorescent marker and said matte material with a charging light for a predetermined time; and
    monitoring emitted light having an initial value from said phosphorescent marker to determine a decay time, said decay time uniquely identifies said cartridge.

30. The method according to claim 29, further comprising diffusely reflecting a portion of said charging light at said matte material.

* * * * *

UNITED STATES PATENT AND TRADEMARK OFFICE
CERTIFICATE OF CORRECTION

PATENT NO. : 6,459,545 B1
DATED : October 1, 2002
INVENTOR(S) : Todd L. Graves and Wayne A. Sumner It is certified that error appears in the above-identified patent and that said Letters Patent is hereby corrected as shown below:

Column 1,
Line 8, delete "in-par" and insert -- in-part -- therefor;

Column 3,
Line 12, delete "farther" and insert -- further -- therefor;
Line 45, the words "FIG. 6" should begin a new paragraph;

Column 4,
Line 21, delete "ZIP" and insert -- ZIP$^{TM}$ -- therefor;

Column 5,
Line 19, delete "$e^{-t/(Tx)}$" and insert -- $e^{-t/(T/X)}$ -- therefor;

Column 6,
Line 60, after the word "marker" insert the numeral -- 20 --;
Line 61, the words "FIG. 6" should begin a new paragraph;

Column 10,
Line 8, delete "farther" and insert -- further -- therefor.

Signed and Sealed this

Ninth Day of September, 2003

JAMES E. ROGAN
*Director of the United States Patent and Trademark Office*